United States Patent
Hertzberg

(10) Patent No.: US 6,637,198 B2
(45) Date of Patent: Oct. 28, 2003

(54) METHOD FOR OPERATING AN EMISSION CONTROL SYSTEM HAVING NITROGEN OXIDE STORAGE

(75) Inventor: Andreas Hertzberg, Stuttgart (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/002,489

(22) Filed: Nov. 1, 2001

(65) Prior Publication Data

US 2002/0092297 A1 Jul. 18, 2002

(30) Foreign Application Priority Data

Nov. 1, 2000 (DE) ......................... 100 54 005

(51) Int. Cl.$^7$ ............................................. F01N 3/00
(52) U.S. Cl. ..................... 60/295; 60/274; 60/277; 60/286
(58) Field of Search .................. 60/274, 276, 277, 60/285, 286, 301, 295

(56) References Cited

U.S. PATENT DOCUMENTS

| | | | | |
|---|---|---|---|---|
| 5,402,641 A | * | 4/1995 | Katoh et al. | 60/285 |
| 5,758,493 A | | 6/1998 | Asik et al. | |
| 5,771,685 A | * | 6/1998 | Hepburn | 60/277 |
| 6,199,372 B1 | * | 3/2001 | Wakamoto | 60/274 |
| 6,205,773 B1 | * | 3/2001 | Suzuki | 60/285 |
| 6,263,666 B1 | * | 7/2001 | Kubo et al. | 60/277 |
| 6,269,634 B1 | * | 8/2001 | Yokota et al. | 60/286 |
| 6,327,848 B1 | * | 12/2001 | Poggio et al. | 60/274 |
| 6,327,849 B1 | * | 12/2001 | Sugiura et al. | 60/277 |
| 6,378,297 B1 | * | 4/2002 | Ito et al. | 60/285 |
| 2002/0148218 A1 | * | 10/2002 | Hertzberg et al. | 60/285 |

FOREIGN PATENT DOCUMENTS

| | | |
|---|---|---|
| DE | 196 35 977 | 3/1998 |
| DE | 197 44 579 | 4/1998 |
| DE | 196 53 958 | 6/1998 |
| DE | 197 52 271 | 6/1998 |
| DE | 195 22 165 | 12/1998 |
| DE | 197 31 624 | 1/1999 |
| DE | 197 47 222 | 3/1999 |
| DE | 197 41 079 | 4/1999 |
| DE | 199 15 793 | 10/2000 |
| DE | 199 20 515 | 11/2000 |
| EP | 0 585 900 | 3/1994 |
| EP | 0 598 916 | 6/1994 |
| EP | 0 598 917 | 6/1994 |
| EP | 0 636 770 | 2/1995 |
| EP | 0 733 786 | 9/1996 |
| EP | 0 733 787 | 9/1996 |
| EP | 0 856 645 | 8/1998 |
| EP | 0 858 837 | 8/1998 |
| EP | 0 867 604 | 9/1998 |
| EP | 0 869 263 | 10/1998 |
| EP | 0 899 430 | 3/1999 |
| EP | 0 905 355 | 3/1999 |

* cited by examiner

Primary Examiner—Thomas Denion
Assistant Examiner—Tu M. Nguyen
(74) Attorney, Agent, or Firm—Kenyon & Kenyon

(57) ABSTRACT

In a method for operating an emission control system having nitrogen oxide storage, for cleaning up a nitrogen oxide-containing, sulfur-contaminated exhaust gas from combustion equipment, from time to time desulfating phases are performed for releasing sulfur intercalated in the nitrogen oxide storage. Two desulfating modes are provided, namely, a main desulfating mode for substantially completely desulfating the nitrogen oxide storage and a partial desulfating mode for partially desulfating same, a lower nitrogen oxide storage minimum temperature and a shorter desulfating target duration being predefined for the partial desulfating processes than for the main desulfating processes. The method may be used, for example, in emission control systems of predominantly lean-combustion operated Otto engines of motor vehicles.

16 Claims, 3 Drawing Sheets

METHOD FOR OPERATING AN EMISSION CONTROL SYSTEM HAVING NITROGEN OXIDE STORAGE

FIELD OF THE INVENTION

The present invention relates to a method for operating an emission control system having nitrogen oxide storage, for cleaning up a nitrogen oxide-containing, sulfur-contaminated exhaust gas from combustion equipment, especially a predominantly lean-combustion operated Otto or Diesel engine in a motor vehicle, according to the method, from time to time desulfating phases being performed for the releasing of sulfur intercalated in the nitrogen oxide storage.

BACKGROUND INFORMATION

As is conventional, for fuel consumption reasons, it is desirable to operate combustion equipment, such as an Otto or Diesel engine in a motor vehicle, predominantly in lean-combustion operation, i.e., having excess air in the combusted air/fuel mixture. However, in the case of Otto engines, lean-combustion operation can only be used in the range of low and medium engine load. At high engine load, it is necessary to change to at least stoichiometric operation, so as to be able to supply the desired torque. When a torque-based engine control is used, an appropriate threshold value for the so-called indicated engine torque can be used as changeover threshold, the latter being an operand formed in the engine control which is determined with the aid of a torque model involving air mass, fuel mass, and, depending on the particular application case, other variables. The indicated engine torque actually differs from engine torque available, for example, at the flywheel of an engine by friction losses not being considered.

During lean-combustion operation, a conventional three-way catalyst is not suitable for effective nitrogen oxide reduction. That is why, in emission control systems for predominantly lean-combustion operated internal combustion engines, nitrogen oxide storages, also known as nitrogen oxide storage catalysts, are installed, which intermediately store nitrogen oxides emitted during lean-combustion operation of the combustion equipment in the form of nitrate. From time to time, short-time desorption phases or regeneration phases are performed using rich mixture operation of the combustion equipment, so as to desorb the nitrogen oxides intermediately stored in nitrate form from the nitrogen oxide storage, and convert them using the available reduction media, such as uncombusted hydrocarbons and carbon monoxide. Diverse procedures suitable for this are conventional, as described, for example, in European Published Patent Application No. 0 585 900 and European Published Patent Application No. 0 598 916. The essential parameters in the nitrogen oxide regeneration of the nitrogen oxide storage are desorption duration and the exhaust gas/air ratio during the desorption. Special strategies for the selection of these desorption parameters are described, for example, in European Published Patent Application No. 0 636 770, European Published Patent Application No. 0 733 786 and German Published Patent Application No. 199 15 793.

The necessity for nitrogen oxide desorption can be detected, for example, by an $NO_x$ sensor downstream from the nitrogen oxide storage, or by a mathematical model of the nitrogen oxide storage which considers, among other things, the quantity of nitrogen oxide brought in since the last desorption, as described, for example, in European Published Patent Application No. 0 598 917, European Published Patent Application No. 0 867 604 and German Published Patent Application No. 196 35 977. Performing a nitrogen oxide desorption before changeover from lean-combustion operation to stoichiometric operation is also conventional, in order to avoid an otherwise threatening, uncontrolled release of stored nitrogen oxide, as described, for example, in German Published Patent Application No. 197 41 079.

A nitrogen oxide storage has effective $NO_x$ storability in a certain temperature window typically between 200° C. and approximately 500° C. If greater temperatures are reached because of increased exhaust gas temperatures, depending on the operational state of the combustion equipment, the change may be made to stoichiometric operation because of the storage effectiveness of the nitrogen oxide storage, which has become worse, but this leads to increased fuel consumption as compared to lean-combustion operation. Temperatures above approximately 800° C. may lead to irreversible damage of the nitrogen oxide storage, and should therefore be avoided by suitable measures.

Nitrogen oxide storages are damaged, in the sense of reduced nitrogen oxide storability, by sulfur contained in the exhaust gas, which mostly traces back to sulfur-containing fuel, by the fact that, during lean-combustion operation, beside the intercalation of nitrate intercalation of sulfur, especially in the form of sulfate can occur. The intercalated sulfates are not released or decomposed, as the case may be, under the conditions of the usual nitrogen oxide desorption states, so that they increasingly lower the nitrogen oxide storability of the nitrogen oxide storage.

From time to time, desulfating phases are performed as a remedy, in which the nitrogen oxide storage is subjected to suitable desulfating conditions, by which intercalated sulfur can be released again. These desulfating conditions typically include the setting of a rich exhaust gas composition and an increased nitrogen oxide storage temperature of over 600° C., e.g., above 650° C., for a sufficient desulfating time which is longer than typical nitrogen oxide desorption time, as described, for example, in European Published Patent Application No. 0 869 263, European Published Patent Application No. 0 899 430, German Published Patent Application No. 197 31 624 and German Published Patent Application No. 197 47 222. The desulfating process is accompanied by a corresponding increase in fuel consumption, because of the requisite rich air ratio and the possibly required measures for heating up the nitrogen oxide storage. In addition, during the setting of the rich air ratio, the effect of a three-way catalyst, frequently used in emission control systems, which in this case, if necessary, can simultaneously function as nitrogen oxide storage, is limited, since its point of optimal functioning occurs at the stoichiometric air ratio. Besides that, after desulfating by nitrogen oxide storage heating up, its cooling down during change to an operating state having lower engine load takes longer, so that one can change only at a later time to fuel-saving lean-combustion operation.

Since the nitrogen oxide storage temperature is an important parameter for desulfating processes, it should be determined as accurately as possible. This can be done using a sensor or with the aid of a mathematical model, the latter involving a model which can be adapted by a temperature sensor, as described in German Published Patent Application No. 197 52 271.

During a desulfating process, there is the danger of a noticeable emission of sulfur compounds, particularly $SO_2$ and $H_2S$. A desulfating method, in which the formation and emission of undesired amounts of $H_2S$ is avoided, is described in German Published Patent Application No. 199 20 515. It is conventional that, in desulfating in the case of only a slightly rich mixture, e.g., with $\lambda=0.99$, less hydrogen sulfide is formed than with setting a smaller air ratio of, for example, $\lambda=0.9$. This basically makes desirable the setting of air ratios slightly below the stoichiometric value $\lambda=1$ for the desulfating phases, the further advantage being achieved thereby that, using such air ratios at equal additional heating measures, higher nitrogen oxide storage temperatures are reached than with smaller air ratios, and the only very weak enrichment leads to a substantially negligible additional fuel consumption and an only slight deterioration of the effect of a possibly present three-way catalyst.

In full load operating conditions of the combustion equipment, particularly in the case of an internal combustion engine, usually a clearly rich air ratio of, e.g., $\lambda=0.9$ is set, for the purpose of increasing engine torque. In this case, in a desulfating process having correspondingly high temperatures to that of the nitrogen oxide storage, there is the danger of noticeable $H_2S$ emissions, of which it may be observed that they are noticeably greater if there is already a relatively large quantity of sulfur in the nitrogen oxide storage.

To recognize, in each case, the need for desulfating, methods for the diagnosis or monitoring of $NO_x$ storing capability by the nitrogen oxide storage on the basis of measuring the storable nitrogen oxide mass or measuring the mass of the reduction medium required for nitrogen oxide desorption are described, for example, in European Published Patent Application No. 0 733 787 and German Published Patent Application No. 197 44 579. Further methods of diagnosis are based on estimating the mass of stored sulfur, as described, for example, in European Published Patent Application No. 0 869 263, European Published Patent Application No. 0 858 837 and German Published Patent Application No. 195 22 165.

In the normal, regular operation of the combustion equipment, it is advantageous to hold the nitrogen oxide storage temperature as low as possible, so as to make possible lean-combustion operation along with sufficient effectiveness of the nitrogen oxide storage, while for desulfating it is desirable to avoid severe cooling of the exhaust gas, so as to be able to reach the required increased nitrogen oxide storage temperature more easily. These requirements can be fulfilled using an emission control system having switchable exhaust gas cooling, e.g., using a two-way emission control system having an exhaust flap, by which one may switch between exhaust pipe branches of different lengths upstream of the nitrogen oxide storage, as described in German Published Patent Application No. 195 22 165 and European Published Patent Application No. 0 856 645. Other concepts for adapting exhaust gas temperature use a connectible heat transfer mechanism, as described, for example, in European Published Patent Application No. 0 905 355 and German Published Patent Application No. 196 53 958, or arrangements for varying headwind flow to the emission control system. Alternatively, one may use an emission control system optimized to severe exhaust gas cooling in connection with, for example, an electrically operated exhaust gas heating device.

In the case of application to internal combustion engines in motor vehicles, deactivating exhaust gas cooling so as to be able to reach sufficiently high desulfating temperatures is expedient in situations, among others, in which the vehicle is frequently moved under high engine load, e.g., on express highway trips and on uphill stretches. Depending on the application of the vehicle, additional combustion equipment-controlled heating measures, in this case engine-related, may be required, for example, when the vehicle is moved principally in city traffic. Such engine-related, additional heat measures, as described, for example, in German Published Patent Application No. 195 22 165 and U.S. Pat. No. 5,758,493, include a time retard of the ignition point, engine operation having different air ratios for the individual cylinders, or a rich mixture operation in connection with a secondary-air injection in the exhaust gas tract, upstream from the nitrogen oxide storage. Since they generally lead to an increase in fuel consumption, they should only be applied to a minimum degree when absolutely necessary.

SUMMARY

It is an object of the present invention to provide a method for operating an emission control system by which the disadvantageous influences of sulfur intercalations in the nitrogen oxide storage may be held to a minimum at relatively low cost and causing the least possible interference with the normal operation of the exhaust gas-emitting combustion device.

The operating method according to the present invention includes two different desulfating operating types, namely, a main desulfating mode and a partial desulfating mode. For the main desulfating mode, the desulfating parameters are selected so that a substantially complete desulfating of the nitrogen oxide storage is achieved. The desulfating parameters for the partial desulfating mode, on the other hand, are selected so that they may be performed more frequently, but that in so doing they influence the normal operation of the combustion device less than the main desulfating process. In particular, partial desulfating requires only a low nitrogen oxide storage temperature and a shorter period of desulfating. Partial desulfating makes possible each time a partial desulfating of the nitrogen oxide storage by which, taken in total over relatively long time periods, a relatively low level of sulfur intercalated in the nitrogen oxide storage may be maintained, without main desulfating having to be performed at comparably short time intervals. The additional, targeted performing of partial desulfating besides the main desulfating process, to be performed at greater time intervals, provides the advantage that less costly and lesser fuel-using additional heating measures suffice for at least partial desulfating of the nitrogen oxide storage, so as to hold the sulfur mass intercalated in the nitrogen oxide storage relatively low over a longer time period, which avoids high $H_2S$ emission, particularly at the beginning of desulfating processes and at full load of the combustion equipment. Furthermore, the use of the two different desulfating modes makes possible an optimized application of additional heating measures controlled by combustion equipment, and optimized use of operating conditions of combustion equipment having high exhaust gas temperatures for the at least partial desulfating of the nitrogen oxide storage at minimum fuel consumption.

A process duration meter may be provided, each for the main and/or partial desulfating phases, using which, even in the case of intermittent interruptions of a desulfating process, the net duration may be automatically measured during which the relevant desulfating conditions were actually present, and thus the desulfating in question was active.

The method according to the present invention may include a suitable criterion for recognizing the necessity for performing a main desulfating phase on the basis of monitoring the nitrogen oxide storage capability of the nitrogen oxide storage and the sulfur mass brought in since the previous main desulfating process. Therefore, partial desulfating possibly performed in the meantime have no influence on the determination of the point in time for the next main desulfating process Suitable criteria for the necessity of a partial desulfating may be provided. If an arrangement for continuous quantitative monitoring of the sulfur mass brought into the nitrogen oxide storage is present, partial desulfating may then be deemed necessary when the brought-in sulfur mass exceeds a predefinable partial desulfating threshold value which is lower than a corresponding main desulfating threshold value that indicates the need for a main desulfating process. Absent the quantitative monitoring of sulfur quantities, a predefined number of partial desulfating processes may be provided at equal time intervals between two main desulfating processes in each case, the points in time for the main desulfating processes being able to be determined from the diagnosis of the nitrogen oxide storage capability of the nitrogen oxide storage.

In the case of a main or partial desulfating process deemed necessary and requiring an additional heat measure, the additional heat measure, and thus the subsequent desulfating process, may only be activated if the nitrogen oxide storage has exceeded a certain heating-up start minimum temperature through the normal operation of the combustion equipment. This arrangement avoids activating desulfating processes at unfavorable points in time which involve a high cost of additional heat. The additional heat measure may be broken off in case the nitrogen oxide storage temperature falls below a heating-up discontinuation temperature which is lower than the heating-up start minimum temperature.

The transition from a partial to a main desulfating process may be made even if the latter is not yet necessary per se, if, due to the operating state of the combustion equipment, and thus at first without additional heat measures, the nitrogen oxide storage temperature required for this is reached, and at least a certain amount of sulfur has already been brought to the nitrogen oxide storage since the last main desulfating process. In case the temperature of the nitrogen oxide storage drops below the minimum temperature for desulfating, the appropriate additional heat measures are performed.

In a similar manner, a main or partial desulfating process may be activated, even if not yet necessary per se, in order to use an already high exhaust gas temperature, due to the combustion source operation, and this is done to perform a main or a partial desulfating process depending on the sulfur quantity brought to the nitrogen oxide storage since a last desulfating process. However, in this case the application of additional heat measures is left out of consideration, even if the temperature of the nitrogen oxide storage drops off.

To terminate a main or partial desulfating process having an additional heat measure, it may be provided that the additional heat measure be deactivated, and then that the partial desulfating process be deactivated at that point in time at which the nitrogen oxide storage temperature has fallen below a predefinable sulfur release minimum temperature. Thereby the heat brought into the nitrogen oxide storage may be used for desulfating as long as possible.

A further refinement of the method according to the present invention may avoid unfavorable lean-combustion operation of the combustion equipment after interruption of an only very short desulfating process at higher sulfur loading of the nitrogen oxide storage.

Another further development of the method according to the present invention may provide, in the application case of a motor vehicle engine having deceleration fuel cutoff, suppressing the latter during main or partial desulfating in general, or in any case at higher vehicle speeds, in order to avoid an interruption of desulfating by the lean-combustion exhaust gas composition during a deceleration fuel cutoff.

In still another further refinement of the method according to the present invention, suppression of full load operation of the combustion equipment at the beginning of a main or partial desulfating process may be provided, whereby a correspondingly strong enrichment of the air/fuel mixture is dispensed with, which precludes excessive $H_2S$ emissions during this time period.

DETAILED DESCRIPTION

Figure 1A:
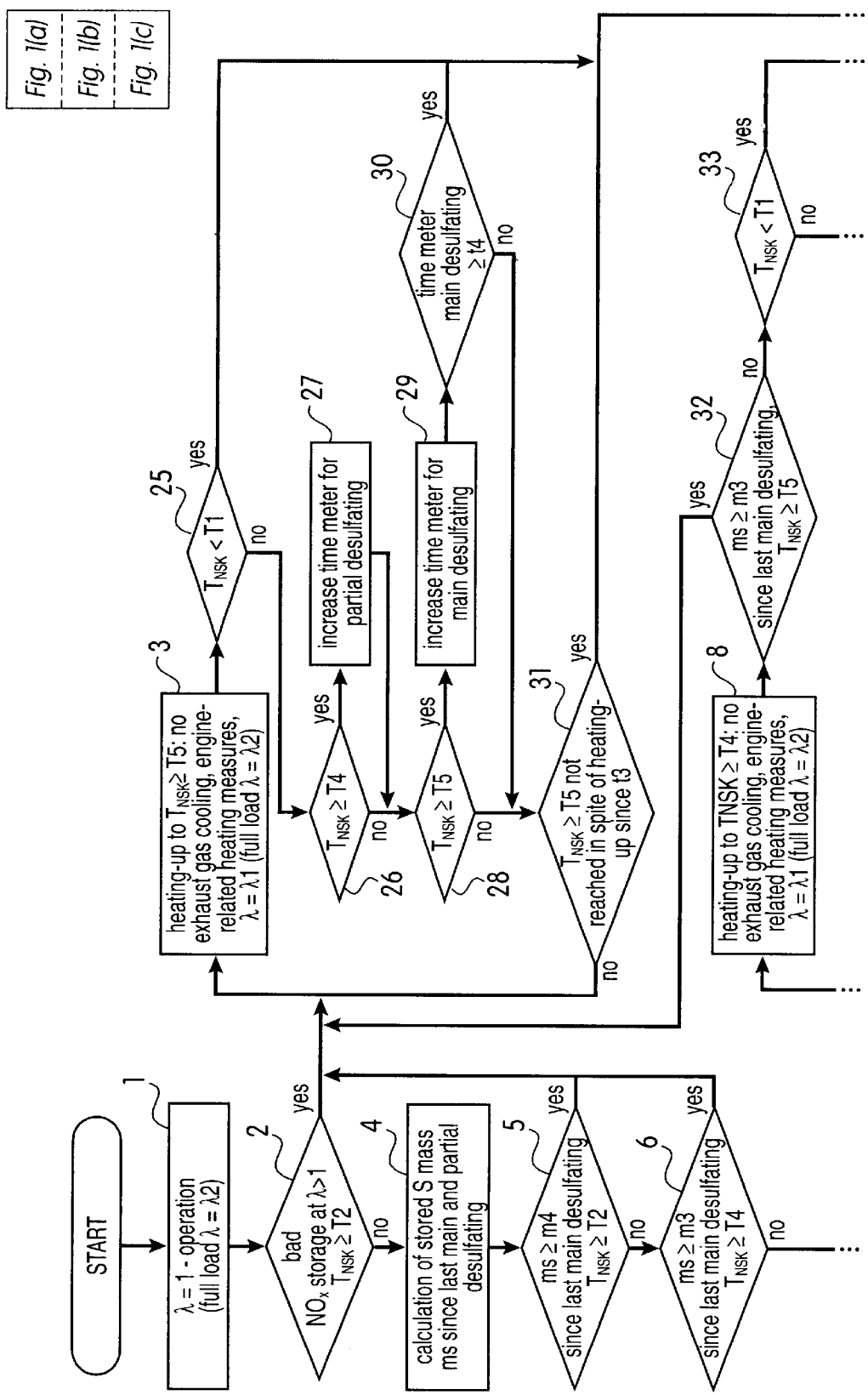
FIGS. 1(a) to 1(c) illustrate a flow diagram of a method for operating an emission control system having a nitrogen oxide storage for cleaning a motor vehicle Otto engine operated predominantly in lean-combustion operation.
Figure 1B:
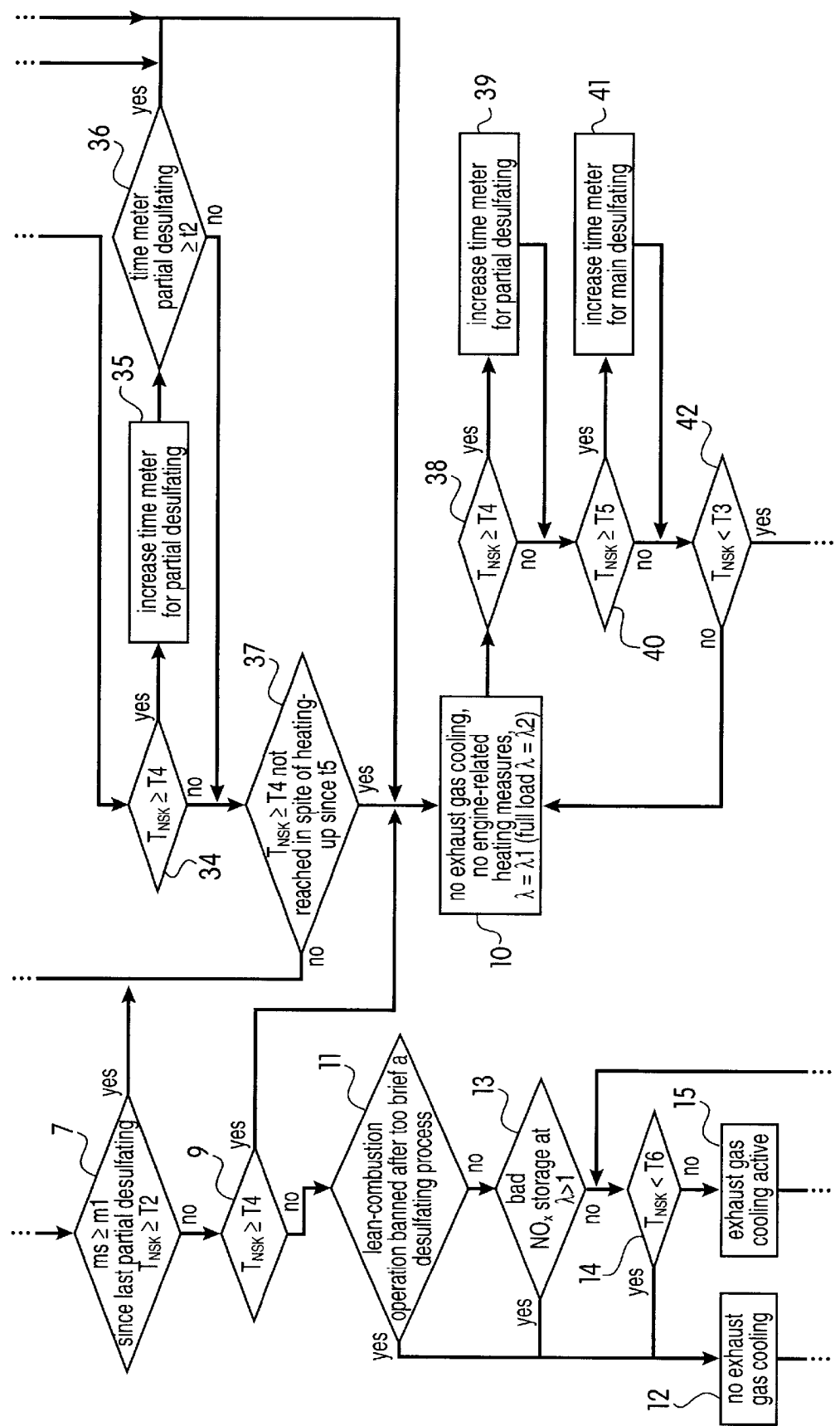
Figure 1C:
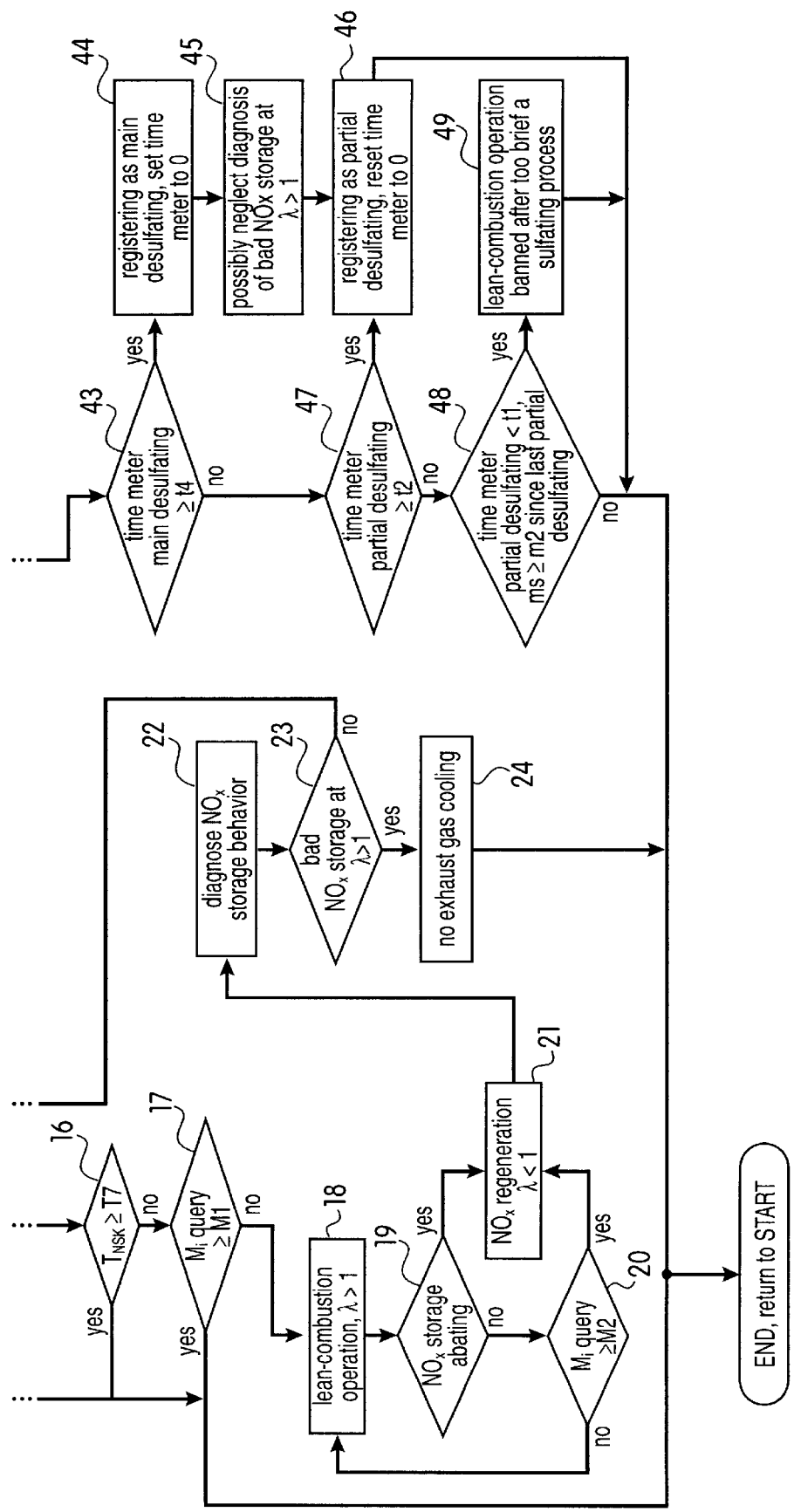

Below, the general measures, properties and advantages of the operating method according to the present invention are explained for which, depending on the application case, requirement and fundamental combustion equipment, a plurality of possible realizations are apparent, subject to observation of these fundamental aspects. Following that, the realization of the method illustrated as a flow diagram in FIGS. 1(a) to 1(c) is then explained using concrete, example numerical values for the individual method parameters.

The operating method according to the present invention, for an emission control system having nitrogen oxide storage, provides two different desulfating operating types and covers the entire effective operating range of the exhaust gas-emitting combustion equipment using optimally adapted desulfating measures, especially also in the case of an Otto or Diesel engine of a motor vehicle operated predominantly in lean-combustion operation.

In particular, a main desulfating mode is provided as a first desulfating operating type, which is configured for a complete and thorough desulfating process for the greatest possible restoration of the original storage capability of the nitrogen oxide storage. The main desulfating parameters selected for this include in particular a minimum temperature of the nitrogen oxide storage of, for example, 680° C. and a desulfating target duration of, for example, 900 s, as well as an only slightly rich exhaust gas/air ratio of, for example, $\lambda=0.99$.

As the second desulfating operating type, a partial desulfating mode is provided, which is configured for an only partial desulfating of the nitrogen oxide storage. The partial desulfating processes may run more frequently than the main desulfating process, and, in contrast to the latter, it may not be used for complete desulfating and thus the sulfur regeneration of the nitrogen oxide storage, but may be used for holding the sulfur quantity or sulfur mass stored in it as low as possible for longer time periods, thereby to prevent a strong increase in fuel consumption by additional heat measures. If, by this measure, the sulfur mass intercalated in the nitrogen oxide storage is held permanently or at least for the greater part of the operating duration, to a relatively low level, then the emission of noticeable amounts of $H_2S$ may be avoided during desulfating processes and full-load operating conditions with clearly rich air ratios such as $\lambda=0.9$. For it has been shown that these $H_2S$ emissions remain low in the relevant situations, as long as the loading of the nitrogen oxide storage with sulfur does not exceed a certain amount.

In line with this objective, the partial desulfating parameters are selected so that partial desulfating, as compared to the main desulfating, runs at a lower nitrogen oxide storage temperature, and is clearly shorter. Correspondingly, the partial desulfating parameters include the predefinition of a minimum temperature for the nitrogen oxide storage, which is so high that sulfur release is still ensured and is lower than the main desulfating minimum temperature. For example, a temperature of 600° C. may be given as the partial desulfating minimum temperature, as well as a partial desulfating targeted duration of 300 s, and also an only slightly rich mixture partial desulfating exhaust gas/air ratio of $\lambda=0.99$.

The duration of both desulfating processes may be measured by two accompanying time meters, which are raised stepwise always at a point that, and for as long as, the conditions for the corresponding desulfating mode is fulfilled, that is, that the respective minimum temperature of the nitrogen oxide storage is reached or exceeded, and the desired slightly rich-mixture exhaust gas/air ratio is present in the nitrogen oxide storage, which may be detected, for example, by a lambda probe downstream from the nitrogen oxide storage. The utilization of the exhaust gas/air ratio detected downstream from the nitrogen oxide storage avoids the raising of the respective desulfating time meter in time periods in which the sulfur release was interrupted by the excess air predominating in the exhaust gas, for example, because of an activated deceleration fuel cutoff in the combustion engine. As soon as the respective time meter has reached the final value which corresponds to the targeted duration of the main or partial desulfating process, the respective desulfating process is regarded as closed. Instead of this use of time-based counters, the targeted durations for the main desulfating processes and the partial desulfating processes may also be predefined on the basis of a certain number of engine working cycles or distance traveled by the vehicle.

The necessity of performing main or partial desulfating is recognized as follows. The decision for a necessary main desulfating process is always taken when, by a pertinent diagnosis, a noticeable deterioration of the $NO_x$ storage capability of the nitrogen oxide storage is determined as a result of sulfur damage. Furthermore, main and partial desulfating processes are necessary when, since the last desulfating process of the same type, a quantity of sulfur has been brought into the nitrogen oxide storage which exceeds a threshold predefined depending on the desulfating type. In this procedure, the quantity of sulfur brought in since the last main desulfating process is ascertained without considering partial desulfating processes which may possibly have occurred in the meantime, that is, the sulfur transfer from the nitrogen oxide storage effected by partial desulfating processes occurring in the meantime remains unconsidered. Since it may be assumed that the sulfur contained in the fuel is absorbed completely by the nitrogen oxide storage, the mass of sulfur stored in it may be determined on the basis of the mass of fuel used, if information on the sulfur content of the fuel is available. Without this knowledge, the mass of sulfur stored may be estimated by the assumption of a fictitious sulfur content. Instead of the mass of fuel used, alternatively, the distance covered may be used for the estimation, under the assumption of a fictitious fuel consumption. Further details on possible methods for estimating the mass of sulfur stored are conventional.

In one example embodiment, a main desulfating process is regarded as necessary when the mass of sulfur brought into the nitrogen oxide storage since the last main desulfating process exceeds a threshold value of 5 g. Since partial desulfating is supposed to occur more frequently than main desulfating, the corresponding partial desulfating sulfur mass threshold is to be selected as less than the main desulfating sulfur mass threshold, and therefore may not be detected by a diagnosis of the nitrogen oxide storage capability. Therefore, the decision on the necessity of a partial desulfating is made only on the basis of the mass of sulfur brought in since the last partial desulfating, i.e., a partial desulfating is considered necessary when the estimated or measured brought-in sulfur mass exceeds the partial desulfating threshold value, which, for example, may be fixed at 0.5 g sulfur.

Alternatively, particularly in cases in which no information is available on the sulfur mass brought into the nitrogen oxide storage, a determination of the time intervals between subsequent partial desulfating processes may be provided, based on the time intervals which come about for subsequent main desulfating processes. For this, the amount of fuel or the travel distance is measured, which has been used or covered, respectively, since a main desulfating, up to the point at which once again a deteriorated $NO_x$ storage capability is diagnosed from the sulfur burden of the nitrogen oxide storage. The desirable intervals for partial desulfating processes may be derived with the aid of division of this main desulfating time interval by a predefinable factor, by which the partial desulfating processes are supposed to occur more frequently than the main desulfating processes. Thus, it may be provided, for example, that partial desulfating processes are performed more frequently than main desulfating processes by a factor of ten. If then, for example, a deteriorated $NO_x$ storage capability is determined after a fuel consumption of 200 l since a main desulfating, first a main desulfating is performed again, and subsequently, in each case after 20 l of fuel, a partial desulfating is performed. The fuel quantity or distance traveled determining the interval between subsequent partial desulfating processes may be corrected after each determination of a deteriorated $NO_x$ storage capability of the nitrogen oxide storage, whereby adaptation of the method to fuels having various sulfur contents is possible, without actually knowing this sulfur content.

If a main or partial desulfating is considered necessary, but the current nitrogen oxide storage temperature is not sufficient for this, targeted additional heat measures are performed. In the case of emission control systems having an exhaust gas cooling function, one heat measure which does not require additional fuel use is to switch to a method of operation without boosted exhaust gas cooling. If the temperature increase achieved by this is insufficient, engine-related methods may be applied, such as ignition retard of the ignition point, engine operation with individual cylinders having different air ratios, or rich mixture operation having secondary air injection in the exhaust gas tract. Details on this and other additional heat measures are conventional.

The intensity of the heating measures depends on which of the two desulfating modes is to be activated, and the measures are kept up, as far as is necessary during the entire desulfating duration, the relevant method parameters being able to be varied as a function of the actual nitrogen oxide storage temperature, the current engine operating point, vehicle speed, and further variables as needed. In each case, the objective is an ensured exceeding of the main desulfating minimum temperature or the partial desulfating minimum temperature, the intensity of the engine-related additional heat measures being held as low as possible, with a view to achieving the lowest possible increased fuel consumption. For this purpose, a model-based temperature control may be used. When the heating measures are started, the exhaust gas/air ratio provided for desulfating is also suppressed.

With regard to determining the nitrogen oxide storage temperature, a temperature value averaged over the length of the nitrogen oxide storage element may be used or the temperature value at about half the length of the nitrogen oxide storage element may be used. In comparison with the temperature at the inlet to the nitrogen oxide storage, such a temperature value already provides a certain smoothing of short-time temperature spikes, as result, for example, from vehicle acceleration phases. The temperature determination may be accomplished sensorically, using one or more conventional temperature sensors positioned in the nitrogen oxide storage element, or with the aid of a mathematical model applied with the aid of a temperature sensor.

In performing a main or partial desulfating, one may distinguish three cases. In the first case, the desulfating process is considered necessary because of a recognized deterioration of the $NO_x$ storage capability of the nitrogen oxide storage or because of the high sulfur mass brought into it since the last desulfating of the same type, but the nitrogen oxide storage temperature is below the relevant desulfating minimum temperature, and is therefore raised with the aid of additional heat measures. In the second case, a main desulfating is not yet necessary, however, the minimum temperature required for it is reached during performing a partial desulfating, so that possibly a changeover to a main desulfating may be made. In the third case, no necessity for a partial or main desulfating is present yet, however, the nitrogen oxide storage temperature, depending on the operating state of the combustion equipment reaches at least the partial desulfating minimum temperature, which may at least be used for a partial desulfating. The three cases are discussed in greater detail below.

If the necessity for a main or partial desulfating were recognized, on the basis of the above mentioned criteria for this, but the nitrogen oxide storage temperature is below the respective desulfating minimum temperature, suitable additional heat measures of the kind explained above are taken up. Therefore, with a view to the increased fuel use remaining low, it is not expedient, in this connection, to start the heating-up process independently of the current operating state of the combustion equipment, that is, in the case of a motor vehicle, of the current driving state, since in unfavorable conditions a very large temperature increase may have to be effected, and the targeted minimum temperature may possibly not be reached at all. That is why the actual value of the nitrogen oxide storage temperature is characteristically used as criterion for the decision as to when a desulfating process is to be started. From this may be directly derived whether the relevant desulfating minimum temperature may be reached by additional heat measures with a justifiable increase in fuel consumption. Thus, the activating point of a desulfating is determined by the operating state of the combustion equipment or the driving state of the vehicle, respectively. In particular, the starting criterion for a desulfating heating-up process may include predefining a heating-up start temperature threshold value such as 520° C., which the nitrogen oxide storage temperature has to reach or exceed in the normal combustion source operation before a heating-up process is started and then, upon reaching the relevant minimum temperature, the desired main or partial desulfating is performed.

In some operating conditions, e.g., during the change of a driving operation from one having a higher engine load to one having a lower one, the case may appear that the nitrogen oxide storage temperature sharply decreases during the desulfating process and, despite the additional heat measures, falls below a heating-up break-off temperature which is below the heating-up start threshold, for example, at 500° C. In this case, the heating-up process is broken off, since an operating state unsuitable for desulfating is present. As soon as the nitrogen oxide storage temperature has once again reached the heating-up start threshold, heating-up is continued.

The heating-up of the nitrogen oxide storage for the original reaching of the relevant desulfating minimum temperature, or for its renewed reaching, after intermediate cooling may be limited in time, so as to avoid that, because of an unsuitable operating state, a very long-lasting heating-up occurs having correspondingly high additional energy consumption, without the targeted desulfating temperature being reached. As an example, the heating-up process for a main desulfating is broken off after 600 s, and for a partial desulfating after 300 s, if the requisite main desulfating or partial desulfating minimum temperatures, respectively, are not reached.

In the second of the three cases differentiated above, a main desulfating is not necessary yet, while a partial desulfating may possibly run accompanied by, for example, engine-related additional heat measures. In this case, if, depending on the operating state, the nitrogen oxide storage temperature rises to the main desulfating minimum temperature, it is possible to continue with additional heat measures for a main desulfating, and thereby to activate a main desulfating, even when the same is not yet absolutely necessary. For, the additional fuel consumption, conditional upon desulfating, is reduced by using this operating state suitable for a main desulfating, since, upon successful conclusion of a main desulfating, the next main desulfating, in which, depending on the operating state or the driving operation, engine-related and/or other additional heat measures are required again, needs to occur only correspondingly later, and besides that, it is not always ensured that, during a running operation, a main desulfating is possible immediately when the need for it is recognized.

However, what may be avoided is that, as a result of a high nitrogen oxide storage temperature during a heating-up process for a partial desulfating, unnecessarily frequently main desulfating processes with corresponding engine-related additional heat measures are performed. For this reason, an appropriate sulfur mass minimum quantity of, for example 3 g is specified as criterion for such a transition to main desulfating, which is below the above-mentioned sulfur mass threshold value for the recognition of a necessary main desulfating. The transition to main desulfating is made only if the sulfur mass, brought into the nitrogen oxide storage since the last main desulfating process exceeds the minimum value of, for example, 3 g, and the nitrogen oxide storage temperature reaches the main desulfating minimum temperature, or has exceeded it.

The third case concerns the situation where neither a main nor a partial desulfating is currently necessary, however, on account of the operating state of the combustion equipment a high nitrogen oxide storage temperature is present, which, for example, may reach the partial desulfating minimum temperature depending on operating or driving state, starting from regular, stoichiometric operation of the combustion equipment without nitrogen oxide storage additional heat measures. In this case, the operating state of high nitrogen oxide storage temperature, favorable for the respective desulfating, is used for a corresponding main or partial desulfating, despite the fact that it is not yet necessary, which, as described above, leads to a reduction of increased fuel consumption conditional upon desulfating.

In this connection, in turn, nitrogen oxide storage heating-up for an as yet unnecessary main desulfating is initiated only when the sulfur mass brought into the nitrogen oxide storage since the last main desulfating exceeds a relevant threshold value, which may again be fixed at 3 g, for example, and when the nitrogen oxide storage temperature has reached the partial desulfating minimum temperature. In this situation, the heating-up process is connected with relatively little increased fuel consumption.

If, however, this sulfur mass threshold value has not yet been reached, the desulfating additional heat measures do not occur. Still, a desulfating process is performed, namely a partial desulfating, since the nitrogen oxide storage temperature is already sufficient for this. For this, depending on the arrangement of the emission control system, the system is switched so that no additional exhaust gas cooling occurs. Since no other heating-up measures are being performed, the additionally reached values of the nitrogen oxide storage temperature and the desulfating duration depend exclusively on the operating or driving state, as the case may be, it being possible that sections of main desulfating come up. Using the above-named time meters, the sections of a partial desulfating and a main desulfating are separately recorded, in relation to the desulfating conditions reached. This desulfating without additional heat measures is terminated when the nitrogen oxide storage has cooled off to below a predefined minimum temperature for the release of sulfur, which is specified at 570° C., for example.

The desulfating process without additional heating measures, and particularly without engine-related additional heating measures, results in substantially no additional fuel consumption, as long as the set air ratio is only slightly below the stoichiometric value $\lambda=1$, as is preferably proposed. Therefore, this is the most advantageous desulfating variant. In the most favorable case, at frequent operation with high load and correspondingly high nitrogen oxide storage temperatures, the requisite main and partial desulfating processes may be performed exclusively without engine-related measures, which minimizes the increased fuel consumption conditional upon desulfating. At the same time then, the desulfating processes occur more frequently and longer than is considered necessary within the framework of the strategy of the present invention. This has advantages with regard to maintaining a high storage capability of the nitrogen oxide storage, and minimizing $H_2S$ emission by the desulfating.

As far as the end of each desulfating process is concerned, possible additional heat measures are terminated at the latest when the targeted duration of each respective desulfating procedure is reached. In order to achieve a most effective desulfating and to use the heat brought into the nitrogen oxide storage by the additional heat measures as long as possible, the desulfating itself is not ended simultaneously with the additional heat measures, but the transition is first made to desulfating without additional heat measures, as described above. This desulfating operation having the suitable air ratio and deactivated exhaust gas cooling is continued until the nitrogen oxide storage temperature has fallen below the above-mentioned minimum temperature for the release of sulfur. Only then is the desulfating procedure closed.

After termination of a complete main desulfating or partial desulfating, this is registered, and the values of the time meters and the value of the sulfur mass brought into the nitrogen oxide storage since the last desulfating of the same type are set back to zero. After a main desulfating, the diagnosis message concerning the deteriorated $NO_x$ storage capability of the nitrogen oxide storage is also reset.

Basically, because of the higher nitrogen oxide storage temperature and the longer duration, a main desulfating also always includes a partial desulfating, the case being possible in which a complete partial desulfating has occurred despite the breaking off a main desulfating process. If a desulfating procedure was begun, but was not completed, the meter values in question are not set back to zero, so that the respective desulfating process is continued when the relevant desulfating conditions are reached again. Switching off the combustion equipment also means a breaking off of possibly active desulfating procedures. These are continued after renewed starting of the combustion equipment, as soon as the relevant desulfating conditions are present.

Experiments have demonstrated that desulfating of very short duration may lead to deterioration of the $NO_x$ storage capability at a higher sulfur loading. For that reason, when a partial desulfating is interrupted, the duration up to that point is compared to a predefined minimum value. If the duration is smaller than this minimum value, and the sulfur mass brought into the nitrogen oxide storage since the last partial desulfating exceeds a relevant, predefinable threshold value, then subsequently no lean-combustion operation of the combustion equipment is permitted, i.e., a suspension or rather, repression of lean-combustion operation occurs. For in this case, the assumption is that the nitrogen oxide storage does not demonstrate sufficient $NO_x$ storage capability. Accordingly, the desulfating is continued as soon as the conditions necessary for it, in particular for the start of a heating-up process, are given. The minimum value of the partial desulfating duration may be, for example, 120 s and the relevant sulfur mass threshold 2 g. The suspension of the lean-combustion operation after too short a desulfating will come up only very rarely in this manner, since the relatively great stored sulfur mass of 2 g since a last partial desulfating is only reached when the attempt to conduct a partial desulfating with additional heat measures, conditioned upon operating state or driving state has remained unsuccessful for a relatively long time. The specification of a minimum duration for a main desulfating is not necessary, since by the time the main desulfating conditions have been reached, basically a partial desulfating has already begun.

After a complete or a broken-off desulfation, the transition is made to stoichiometric operation or, at full load, the relevant enrichment is maintained. If a deteriorated NOx storage capability is diagnosed, or the lean-combustion operation suspension is valid because of too short a desulfating, a desulfating should occur again as soon as possible. In order to make it easier to reach the nitrogen oxide storage temperature necessary for the continuation of the desulfating process, the emission control system is kept at its setting, without additional exhaust gas cooling.

In the time intervals without desulfating, lean-combustion operation of the combustion equipment is desirable as far as possible. Starting from stoichiometric operation, as described above, the necessity for a desulfating process is checked, and possibly a main or a partial desulfating is performed, in order then to return again to stoichiometric operation and to check whether the assumption of fuel-saving lean-combustion operation is fulfilled, which requires in particular that a satisfactory $NO_x$ storage capability of the nitrogen oxide storage is to be expected. Thus, no deteriorated $NO_x$ storage capability may be diagnosed, nor may the lean-combustion operation suspension be present. A further assumption is a sufficiently low nitrogen oxide storage temperature, for which the undershooting of a relevant temperature threshold of, for example, 470° C. may be required. Besides that, the indicated engine torque demanded by the driver must permit the changeover to lean-combustion operation, which is valid, with a relevant threshold value such as 100 Nm, when the indicated engine torque is below this threshold value. If one of these lean-combustion operation assumptions is not fulfilled, the stoichiometric operation is maintained.

In the lean-combustion operation of the combustion equipment, the emission control system is switched to boosted exhaust gas, as long as the nitrogen oxide storage temperature is still above a relevant minimum value for satisfactory $NO_x$ storage, which, for example, may be fixed at 250° C. During undershooting of this temperature, the emission control system is switched to least possible exhaust gas cooling, in order to raise the nitrogen oxide storage temperature again.

A lean-combustion operating phase may in each case be maintained as long as the nitrogen oxide storage may no longer absorb all the nitrogen oxide, which may be determined by using an $NO_x$ sensor downstream from the nitrogen oxide storage or with the aid of a mathematical nitrogen oxide storage model. By the application of an $NO_x$ sensor, a maximum $NO_x$ concentration or a maximum $NO_x$ mass flow in the exhaust gas downstream from the nitrogen oxide storage may be used as criterion for an abating $NO_x$ storage. By using a model, a maximum $NO_x$ loading of the nitrogen oxide storage or a minimum degree of storage efficiency gains consideration as a criterion. If it is recognized by one of these ways that the nitrogen oxide storage is essentially fully loaded, a brief nitrogen oxide desorption phase is performed with a rich air ratio. Such is also required when the indicated engine torque demanded by the driver is raised, and may no longer be made available in lean-combustion operation, so that a change to stoichiometric or rich operation is necessary. The exceeding of a relevant threshold value of, for example, 110 Nm by the demanded engine torque may be used as criterion for leaving lean combustion operation. This threshold value may be greater than the one for operating type change in the opposite direction, by 10 Nm for the numerical example given, in order to avoid unnecessarily frequent changes between lean-combustion operation and stoichiometric operation.

For the recognition of possible sulfur contamination, the $NO_x$ storage capability of the nitrogen oxide storage is diagnosed in each case during a nitrogen oxide desorption phase, by ascertaining the absorbed nitrogen oxide mass or the reduction medium mass required for its reduction in the usual way. Once sulfur contamination has been recognized, a changeover is made to stoichiometric operation after the end of nitrogen oxide desorption, and lean-combustion operation is no longer permitted. Instead, performing a main desulfating is aimed for. To make it easier to reach the necessary nitrogen oxide storage temperature, the emission control system is switched to its setting without additional exhaust gas cooling. On the other hand, if no sulfur-conditioned deterioration of the $NO_x$ storage capability has been determined, after the termination of the nitrogen oxide desorption a test is made again to see whether lean-combustion operation is permissible, so as then to continue, depending on the situation, with lean-combustion operation or stoichiometric operation or, at full load, with rich operation of the combustion equipment.

Using conventional, suitable measures, the nitrogen oxide storage is protected from temperatures higher than approximately 800° C., e.g., by a clear-cut mixture enrichment, by deactivating all heating-up measures and/or by switching the emission control system to maximum exhaust gas cooling. This temperature protection measure is superimposed on the remaining measures of the method, so that it may be performed any time when needed, independently of processes that may be running.

Furthermore, operating measures for the optimization of the cold start phase and the warm-up phase may be provided. For rapid nitrogen oxide storage heating-up in the warm-up phase, additional heat measures may be used corresponding to those which are mentioned above for reaching a sufficient desulfating temperature. Lean-combustion operation is first permitted when a suitable, relevant minimum temperature of the nitrogen oxide storage is reached, and below this temperature threshold, the combustion equipment is operated stoichiometrically with a rich mixture, and, in addition, the emission control system is switched to a setting in which no boosted exhaust gas cooling occurs. It may also be provided, depending on the cold start strategy, that lean-combustion operation is permitted only when a cooling medium assigned to the combustion equipment has reached a certain minimum temperature.

As far as full load operation is concerned, it is usual, especially in the case of the Otto engine, to set a clearly rich air ratio, such as $\lambda=0.9$, to reduce the knock hazard, and to select the ignition timing with regard to high combustion efficiency and high engine torque. This full load enrichment may be provided, for the case in hand, starting from stoichiometric operation as well as during a desulfating. Alternatively, one may do without this customary enrichment during periods with great release of sulfur, that is, at the beginning of a desulfating phase, and set the air ratio to a value favorable for a desulfating with low $H_2S$ emission.

In the application case of motor vehicle engines having an deceleration fuel cutoff function, it is possible to do without deceleration fuel cutoff during the desulfating processes, and instead to continue combustion with little sucked-in air mass but unchanged air ratio, so as to avoid having the deceleration fuel cutoff phases interrupt the process of releasing sulfur through lean-combustion exhaust gas. In order still to offer a driver the accustomed deceleration of the vehicle in the overrun mode, deterioration of combustion efficiency may be brought about by post-ignition ignition, and thereby the engine torque may be held down. As a variant of this measure, it may be provided that one does without deceleration fuel cutoff only when the vehicle speed is above a relevant predefinable threshold value. At higher speeds, because of the higher total running resistance, omission of the deceleration fuel cutoff effect has a lesser effect on vehicle deceleration than at lower speeds. Thus, at least at higher speeds, the process of the release of sulfur is not interrupted.

As a further operating variant, it may be provided that the setting of a rich air ratio for desulfating is permitted only when the vehicle speed is above a relevant predefinable threshold value. The threshold value may be selected so that it is higher than speeds normally reached in city traffic, so that generally no release of sulfur occurs in city traffic. At higher speeds, there is a strong dilution of the emitted exhaust gas by the air stream, which excludes for the most part the nuisance of a bad smell from sulfur compounds possibly emitted in small quantities along with the exhaust gas.

During the main and partial desulfating processes, the air ratio does not necessarily have to be held to a constant value, but may be varied as required by a conventional method, e.g., time-controlled or as a function of the output signal of a sensor, e.g., a lambda probe, downstream from the nitrogen oxide storage.

The above-mentioned threshold values for the sulfur mass stored in, i.e., brought into the nitrogen oxide storage since the last main or partial desulfating, which largely determine the frequency of desulfating processes, may be predefined as constant values, but alternatively may also be given as a function of the deteriorating condition of the nitrogen oxide storage. In particular, an adaptive adjustment of these sulfur mass threshold values to the frequency of determination of a deteriorated $NO_x$ storage capability of the nitrogen oxide storage may be provided, whereby the intervals between subsequent partial or main desulfating processes may be adjusted optimally to the actual condition of the nitrogen oxide storage.

The method according to the present invention is not only suitable for Otto engines, but also for Diesel engines in mobile and also stationary applications as well as for any number of other examples of combustion equipment which emit exhaust gas that has to be treated, containing nitrogen and sulfur contamination. For illustrative purposes, an example embodiment of the present invention, of a motor vehicle Otto engine is discussed using concrete example numerical values, with reference to the flow diagram illustrated.

This method example starts first of all from a stoichiometric operation ($\lambda$=1) or a full load operation having an air ratio $\lambda 2$ of, for example, 0.90 (step 1). In lean-combustion operation, ($\lambda$>1), if there is a diagnosis of deteriorated $NO_x$ storage capability of the nitrogen oxide storage, and its temperature $T_{NSK}$ has reached or exceeded a heating-up start threshold value T2 of, for example, 520° C., (query step 2), an additional heating-up process having engine-related heating measures and deactivation of exhaust gas cooling, as well as a setting of a slightly rich air ratio $\lambda 1$ of, for example, 0.99 or the maintaining of full load enrichment $\lambda 2$ is started, so as to heat up the nitrogen oxide storage to at least the main desulfating minimum temperature T5 of, for example, 680° C. (step 3).

However, if these heating-up conditions are not given, then in the next step, step 4, sulfur mass ms, brought into the nitrogen oxide storage and stored in it, is continuously determined with respect to main desulfating and with respect to the last partial desulfating. Then a query is put as to whether the main desulfating conditions are present, i.e., whether the calculated sulfur mass ms has reached at least a predefined threshold value m4 of, for example, 5 g, and the nitrogen oxide storage temperature $T_{NSK}$ is greater than or equal to the heating-up start minimum temperature T2 (step 5). If yes, the change to heating-up step 3 is made. Other than that, a query is also put as to whether a partial desulfating should make a transition to a main desulfating, that is, whether calculated sulfur mass ms has reached threshold value m3, predefined for this situation, of, for example, 3 g, and whether the nitrogen oxide storage temperature $T_{NSK}$ is at or above a predefined partial sulfating minimum temperature T4 of, for example, 600° C. (step 6). If yes, the transition is made, in turn, to main desulfating heating-up step 3.

Otherwise, the query is put as to whether the conditions for partial desulfating heating-up are present, i.e., whether calculated sulfur mass ms has reached a threshold value m1 for this situation of, for example, 0.5 g since the last partial desulfating and nitrogen oxide storage temperature $T_{NSK}$ is at or above the heating-up start minimum temperature T2 (step 7). If this is the case, a partial desulfating heating-up step 8 is activated, in order to raise the nitrogen oxide storage to at least the partial desulfating minimum temperature T4. For this purpose, a possible exhaust gas cooling is deactivated, and suitable engine-related heating measures are resorted to, and also the slightly rich desulfating air ratio $\lambda 1$ is set or full load enrichment $\lambda 2$ is maintained, respectively.

If the partial desulfating heating-up conditions are not present, a determination is made as to whether the nitrogen oxide storage temperature $T_{NSK}$ is at or above the partial desulfating minimum temperature T4 (step 9). If yes, transition is made to a heating-up step 10. Otherwise, a query is put as to whether the conditions for suspension of lean-combustion operation are present, particularly because of too short a desulfating (step 11). If yes, a possibly active exhaust gas cooling is deactivated (step 12), whereafter one cycle of the method is finished. Furthermore, a query is put as to whether a deteriorated $NO_x$ storage capability at lean-combustion operation has been revealed (step 13). If yes, the end of the cycle is again reached via exhaust gas cooling deactivating step 12. The latter is also the case if it is determined in a next step 14 that the nitrogen oxide storage temperature $T_{NSK}$ is below a minimum temperature T6, desirable for lean-combustion operation, of, for example, 250° C.

Otherwise, exhaust gas cooling is activated or maintained active, as the case may be, in a next step 15. Subsequently, it is determined whether nitrogen oxide storage temperature $T_{NSK}$ has reached a minimum temperature T7 of, for example, 470° C., required for satisfactory $NO_x$ storage (step 16). If yes, the end of the cycle has been reached, otherwise a further query is put as to whether the indicated engine torque $M_i$ has a predefinable minimum value M1 of, for example, 100 Nm (step 17). If yes, the end of the cycle has been reached, otherwise a lean-combustion operation phase may be activated (step 18). In the course of that it is monitored continuously whether the $NO_x$ storage capability of the nitrogen oxide storage is abating (step 19) and whether the indicated engine torque $M_i$ has reached or exceeded a lean-combustion operation end threshold value M2 of, for example, 110 Nm (step 20). As long as neither is the case, lean-combustion operation is maintained. Otherwise, a nitrogen oxide desorption phase occurs having a rich air ratio (step 21). During this, the $NO_x$ storage behavior of the nitrogen oxide storage is diagnosed (step 22), in order to query concerning possible deterioration of same in lean-combustion operation (step 23), and if yes, to reach the end of the cycle by deactivation of the exhaust gas cooling (step 24), while otherwise the next step goes back to before temperature query 14 regarding minimum temperature T6 for satisfactory $NO_x$ storage.

If main desulfating heating-up step 3 was activated, the query is first of all put as to whether the nitrogen oxide storage temperature $T_{NSK}$ has fallen below a heating-up breaking off minimum value T1 (step 25). If yes, the next step skips to heating-up step 10, having a desulfating air ratio $\lambda 1$ or full load enrichment $\lambda 2$. Otherwise, the next query is nitrogen oxide storage temperature $T_{NSK}$ has reached the partial desulfating minimum temperature T4 (step 26), and if yes, so as to recognize the performing of a partial desulfating and to increment the respective time meter (step 27). After that, or otherwise, the query is put as to whether nitrogen oxide storage temperature $T_{NSK}$ has reached the main desulfating minimum temperature T5 (step 28) so as to value this as a main desulfating in the case of yes, and to increase the respective time meter (step 29) and subsequently to put the query as to whether the main desulfating duration has as yet reached a target value t4 of, for example, 900 s (step 30). If this is the case, after such a complete main desulfating, the next step is heating-up step 10. Otherwise, the query is put as to whether the main desulfating minimum temperature T5 could not be reached, despite a predefined maximum heating-up duration t3 of, for example, 600 s (step 31), in order to go on to heating-up step 10 if yes, and otherwise to return again to heating-up step 3.

If partial desulfating heating-up step 8 was activated, the query is subsequently put as to whether sulfur mass ms, stored since the last main desulfating, has reached the threshold value m3 decisive for the transition to main desulfating, and whether the nitrogen oxide storage temperature $T_{NSK}$ is at least at the main desulfating minimum temperature T5, whereupon the change is made to the main desulfating heating-up step 3 (step 32). Otherwise, the query is first of all jut as to whether the nitrogen oxide storage temperature $T_{NSK}$ has fallen below a heating-up breaking off minimum value T1 (step 33). If yes, the next step skips to heating-up step 10, having a desulfating air ratio λ1 or full load enrichment λ2. Otherwise, the query is put as to whether nitrogen oxide storage temperature $T_{NSK}$ has reached the partial desulfating minimum value T4 (step 34). If this is the case, it is recognized as partial desulfating and the relevant time meter is incremented (step 35), in order to query subsequently whether the partial desulfating duration has reached a predefined target value of, for example, 300 s (step 36). If yes, after such a complete desulfating, the next step proceeds to heating-up step 10. Otherwise, it is examined whether the nitrogen oxide storage could not reach partial desulfating minimum temperature T4, despite a heating-up running since a predefinable maximum duration t5 of, for example, 300 s (step 37), in order to proceed, in the yes case, to heating-up step 10, otherwise, however, to return to the partial desulfating heating-up step.

Subsequently to heating-up step 10, the query is put as to whether nitrogen oxide storage temperature $T_{NSK}$ even is at least at the desulfating minimum temperature T4 (step 38), so that, if yes, one may conclude that there is a lasting partial desulfating occurring, and may increment the relevant time meter (step 39). Thereafter, or otherwise, the query is put as to whether nitrogen oxide storage temperature $T_{NSK}$ still is at or above main desulfating minimum temperature T5 (step 40), so as to conclude, in the yes case, that there is a continuing main desulfating occurring and to increment the time meter (step 41). After that, or otherwise, the query is put as to whether nitrogen oxide storage temperature $T_{NSK}$ has fallen below a minimum temperature T3 of, for example, 570° C. necessary for the release of sulfur (step 41). After that, or otherwise, the query is put as to whether nitrogen oxide storage temperature $T_{NSK}$ has undershot a minimum temperature T3 of, for example, 570° C. necessary for sulfur release (step 42).

As long as this is not the case, the next step returns to heating-up step 10. If, on the other hand, it is the case, the query is put as to whether the time meter value for the main desulfating has reached the targeted duration t4 for complete main desulfating (step 43), in order to register the complete main desulfating in the case of yes, and to set back the respective time meter (step 44), and as far as it is present, also to neglect diagnosis information concerning insufficient $NO_x$ storage capability (step 45). Since this also encompasses a partial desulfating, additionally a registering as partial desulfating occurs and a setting back of the corresponding time meters (step 46). The latter also occurs in the case that, with non-terminated main desulfating, a query concerning partial desulfating duration (step 47) reveals that it has reached its target value t2. After that, the end of the cycle is reached. If there is also as yet no complete partial desulfating, it is determined whether a partial desulfating was active at least for a predefinable minimum duration t1 of, for example, 120 s and whether, since a previous partial desulfating, sulfur mass ms, absorbed by the nitrogen oxide storage, has reached a relevant predefinable threshold value m2 of, for example, 2 g (step 48). If yes, this corresponds to the conditions in which subsequently no lean-combustion operation should be permitted, that is, a lean-combustion operation suspension occurs (step 49). This completes the method cycle.

What is claimed is:

1. A method for operating an emission control system having a nitrogen oxide storage for cleaning a nitrogen oxide-containing, sulfur-contaminated exhaust gas of a combustion device, comprising the step of:

performing desulfating phases time to time to release sulfur intercalated in the nitrogen oxide storage, the desulfating phases including a main desulfating mode for substantially completely desulfating the nitrogen oxide storage and a partial desulfating mode for partially desulfating the nitrogen oxide storage, the partial desulfating phase having a predefined lower nitrogen oxide storage minimum temperature and a predefined shorter desulfating target duration than the main desulfating phase.

2. The method according to claim 1, wherein the combustion device includes a predominantly lean-combustion operated Otto engine of a motor vehicle.

3. The method according to claim 1, wherein the combustion device includes a predominantly lean-combustion operated Diesel engine of a motor vehicle.

4. The method according to claim 1, wherein the partial desulfating minimum temperature is approximately 600° C. and the main desulfating minimum temperature is approximately 680° C.

5. The method according to claim 1, further comprising the step of providing a desulfating time meter for at least one of the main desulfating phase and the partial desulfating phase, the time meter measuring a duration during which at least one of main desulfating phase conditions and partial desulfating phase conditions are present.

6. The method according to claim 1, further comprising the step of:

ceasing a deceleration fuel cutoff function of the emission control system of a motor vehicle during one of the main desulfating phase and the partial desulfating phase one of generally and when a vehicle speed is greater than a predefinable threshold value.

7. The method according to claim 1, further comprising the step of:

ceasing a full-load operation at a beginning of one of the main desulfating phase and the partial desulfating phase.

8. The method according to claim 1, further comprising the steps of:

monitoring a nitrogen oxide storage capability of the nitrogen oxide storage and a quantity of sulfur brought into the nitrogen oxide storage since a last main desulfating phase; and determining a necessity for a main desulfating phase when one of the nitrogen oxide storage capability has decreased by a predefinable amount and the quantity of sulfur brought into the nitrogen oxide storage exceeds a predefinable main desulfating threshold value.

9. The method according to claim 8, further comprising the steps of:
   determining a duration since a last main desulfating phase and until a determination of the necessity for a next main desulfating phase; and
   performing subsequent partial desulfating phases at intervals corresponding to a predefinable fraction of the duration since the last main desulfating phase.

10. The method according to claim 8, further comprising the step of:
    activating one of the main desulfating phase and the partial desulfating phase, without a determined necessity therefor, when the nitrogen oxide storage temperature reaches the partial desulfating minimum temperature and in accordance with an operating state of the combustion device, the main desulfating phase being performed if the sulfur quantity brought into the nitrogen oxide storage since the last main desulfating phase exceeds a predefinable threshold value, otherwise, the partial desulfating phase being performed as long as the nitrogen oxide storage temperature does not fall below a predefinable sulfur release minimal temperature, which is lower than the partial desulfating minimum temperature.

11. The method according to claim 8, further comprising the step of:
    before terminating at least one of the main desulfating phase and the partial desulfating phase using a nitrogen oxide storage additional heat measure, deactivating the additional heat measure and then deactivating the at least one of the main desulfating phase and the partial desulfating phase as soon as the nitrogen oxide storage temperature falls below a predefinable sulfur release minimum temperature.

12. The method according to claim 8, further comprising the step of providing a lean-combustion operation suspension if, after an interruption of the partial desulfating phase, a duration thereof is shorter than a predefinable minimum duration and the sulfur quantity brought into the nitrogen oxide storage since the interruption exceeds a predefinable threshold value.

13. A method for operating an emission control system having a nitrogen oxide storage for cleaning a nitrogen oxide-containing, sulfur-contaminated exhaust gas of a combustion device, comprising the steps of:
    performing desulfating phases time to time to release sulfur intercalated in the nitrogen oxide storage, the desulfating phases including a main desulfating mode for substantially completely the nitrogen oxide storage and a partial desulfating mode for partially desulfating the nitrogen oxide storage, the partial desulfating phase having a predefined lower nitrogen oxide storage minimum temperature and a predefined shorter desulfating target duration than the main desulfating phase;
    monitoring a nitrogen oxide storage capability of the nitrogen oxide storage and a quantity of sulfur brought into the nitrogen oxide storage since a last main desulfating phase;
    determining a necessity for a main desulfating phase when one of the nitrogen oxide storage capability has decreased by a predefinable amount and the quantity of sulfur brought into the nitrogen oxide storage exceeds a predefinable main desulfating threshold value;
    monitoring a quantity of sulfur brought into the nitrogen oxide storage since a last partial desulfating phase; and
    determining a necessity for a partial desulfating phase when the quantity of sulfur brought into the nitrogen oxide storage exceeds a predefinable partial desulfating threshold value, the predefinable partial desulfating threshold value being lower than the predefinable main desulfating threshold value.

14. The method according to claim 13, further comprising the step of:
    activating a nitrogen oxide storage heating-up after a determined necessity for one of the main desulfating phase and the partial desulfating phase at a nitrogen oxide storage temperature below the respective main desulfating minimum temperature and the partial desulfating minimum temperature as soon as the nitrogen oxide storage temperature in a normal operation of the combustion device exceeds a predefinable heating-up start minimum temperature, which is lower than the main and partial desulfating phase minimum temperatures.

15. The method according to claim 14, further comprising the step of:
    breaking off the nitrogen oxide storage heating-up when the nitrogen oxide storage temperature falls below a heating-up break-off temperature, which is lower than the heating-up start minimum temperature.

16. A method for operating an emission control system having a nitrogen oxide storage for cleaning a nitrogen oxide-containing, sulfur-contaminated exhaust gas of a combustion device, comprising the steps of:
    performing desulfating phases time to time to release sulfur intercalated in the nitrogen oxide storage, the desulfating phases including a main desulfating mode for substantially completely desulfating the nitrogen oxide storage and a partial desulfating mode for partially desulfating the nitrogen oxide storage, the partial desulfating phase having a predefined lower nitrogen oxide storage minimum temperature and a predefined shorter desulfating target duration than the main desulfating phase;
    monitoring a nitrogen oxide storage capability of the nitrogen oxide storage and a quantity of sulfur brought into the nitrogen oxide storage since a last main desulfating phase;
    determining a necessity for a main desulfating phase when one of the nitrogen oxide storage capability has decreased by a predefinable amount and the quantity of sulfur brought into the nitrogen oxide storage exceeds a predefinable main desulfating threshold value; and
    making a transition from the partial desulfating phase to the main desulfating phase, without a determined necessity for the transition, when the nitrogen oxide storage temperature has reached the main desulfating minimum temperature during the partial desulfating phase and in accordance with an operational state of the combustion device and when the sulfur quantity brought into the nitrogen oxide storage since the last main desulfating phase exceeds a predefinable threshold value, which is smaller than the main desulfating threshold value.

* * * * *

UNITED STATES PATENT AND TRADEMARK OFFICE
CERTIFICATE OF CORRECTION

PATENT NO. : 6,637,198 B2
DATED : October 28, 2003
INVENTOR(S) : Andreas Hertzberg It is certified that error appears in the above-identified patent and that said Letters Patent is hereby corrected as shown below:

Column 15,
Line 64, after "threshold value" change "ml" to -- m1 --.

Column 16,
Line 8, change "λ1" and "λ2" to -- λ1 -- and -- λ2 --; and

Column 17,
Line 19, change "jut" to -- put --.

Signed and Sealed this

Twenty-fourth Day of August, 2004

JON W. DUDAS
*Director of the United States Patent and Trademark Office*